(12) United States Patent
King et al.

(10) Patent No.: US 11,616,434 B2
(45) Date of Patent: Mar. 28, 2023

(54) MULTIPHASE INDUCTIVE BOOST CONVERTER WITH MULTIPLE OPERATIONAL PHASES

(71) Applicant: Cirrus Logic International Semiconductor Ltd., Edinburgh (GB)

(72) Inventors: Eric J. King, Austin, TX (US); John L. Melanson, Austin, TX (US); Graeme G. Mackay, Austin, TX (US); Lingli Zhang, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/892,575

(22) Filed: Aug. 22, 2022

(65) Prior Publication Data

US 2022/0393576 A1 Dec. 8, 2022

Related U.S. Application Data

(63) Continuation of application No. 17/075,139, filed on Oct. 20, 2020, now Pat. No. 11,469,661.

(60) Provisional application No. 62/926,046, filed on Oct. 25, 2019.

(51) Int. Cl.
*H02J 7/00* (2006.01)
*H02M 3/04* (2006.01)
*H04R 3/00* (2006.01)

(52) U.S. Cl.
CPC .............. *H02M 3/04* (2013.01); *H02J 7/0047* (2013.01); *H02J 7/00712* (2020.01); *H02J 2207/20* (2020.01); *H04R 3/00* (2013.01)

(58) Field of Classification Search
CPC ....... H02M 3/04; H02J 7/00712; H02J 7/0047
See application file for complete search history.

(56) References Cited

U.S. PATENT DOCUMENTS

| 5,248,524 A | 9/1993 | Soderlund |
| 5,617,016 A | 4/1997 | Borghi et al. |
| 5,757,167 A | 5/1998 | Arora et al. |

(Continued)

FOREIGN PATENT DOCUMENTS

| CN | 110784140 A | 2/2020 |
| EP | 1919058 A2 | 5/2008 |

(Continued)

OTHER PUBLICATIONS

International Search Report and Written Opinion of the International Searching Authority, International Application No. PCT/US2021/039373, dated Sep. 22, 2021.

(Continued)

*Primary Examiner* — Robert Grant
(74) *Attorney, Agent, or Firm* — Jackson Walker L.L.P.

(57) ABSTRACT

A battery management system configured to electrically couple to a battery may include a boost converter comprising a plurality of switches arranged to provide a boosted output voltage at an output of the boost converter from a source voltage of the battery and a bypass switch coupled between the battery and the output, wherein the battery management system is operable in a plurality of modes comprising a bypass mode wherein the source voltage is bypassed to the output and when the battery management system is in the bypass mode, at least one switch of the plurality of switches is enabled to increase a conductance between the battery and the output.

18 Claims, 6 Drawing Sheets

(56) References Cited

U.S. PATENT DOCUMENTS

| | | | |
|---|---|---|---|
| 6,177,783 | B1 | 6/2001 | Donohue |
| 6,597,158 | B2 | 7/2003 | Umeda |
| 7,102,340 | B1 | 9/2006 | Ferguson |
| 7,190,150 | B2 | 3/2007 | Chen et al. |
| 7,906,939 | B2 | 3/2011 | Kung et al. |
| 9,088,247 | B2 | 7/2015 | Amo et al. |
| 9,577,587 | B2 | 2/2017 | Maru et al. |
| 9,639,102 | B2 | 5/2017 | Dally |
| 9,742,393 | B2 | 8/2017 | Pavao-Moreira et al. |
| 10,263,523 | B1 | 4/2019 | Sonntag et al. |
| 10,476,392 | B1 | 11/2019 | Matsuura et al. |
| 10,673,423 | B2 | 6/2020 | Forghani-Zadeh et al. |
| 10,720,835 | B2 | 7/2020 | King et al. |
| 10,734,885 | B2 | 8/2020 | King et al. |
| 2001/0020802 | A1 | 9/2001 | Kitagawa et al. |
| 2005/0264268 | A1 | 12/2005 | Jeno |
| 2006/0139819 | A1 | 6/2006 | May |
| 2008/0129219 | A1 | 6/2008 | Smith et al. |
| 2008/0278136 | A1 | 11/2008 | Murtojarvi |
| 2009/0266397 | A1 | 10/2009 | Gibson et al. |
| 2010/0019702 | A1 | 1/2010 | Jang et al. |
| 2010/0156175 | A1 | 6/2010 | Wei |
| 2011/0075446 | A1 | 3/2011 | Doutreloigne et al. |
| 2011/0121653 | A1 | 5/2011 | Hartular et al. |
| 2012/0205974 | A1 | 8/2012 | McCaslin et al. |
| 2012/0268094 | A1 | 10/2012 | Scaldaferri et al. |
| 2013/0049699 | A1* | 2/2013 | Jayaraman ............... H02M 1/10 320/137 |
| 2013/0106188 | A1 | 5/2013 | Ishibashi et al. |
| 2014/0197814 | A1 | 7/2014 | Shi et al. |
| 2016/0064986 | A1 | 3/2016 | Langlinais et al. |
| 2017/0005647 | A1 | 1/2017 | Pan et al. |
| 2017/0072812 | A1 | 3/2017 | Von Novak et al. |
| 2019/0181754 | A1 | 6/2019 | Ash et al. |
| 2019/0245444 | A1 | 8/2019 | Kimura |
| 2020/0235712 | A1 | 7/2020 | May et al. |
| 2021/0083578 | A1 | 3/2021 | King et al. |
| 2021/0159798 | A1 | 5/2021 | Mackay et al. |
| 2021/0364560 | A1 | 11/2021 | Holland et al. |
| 2021/0367510 | A1 | 11/2021 | Lawrence et al. |
| 2021/0367513 | A1 | 11/2021 | Mackay et al. |
| 2021/0367514 | A1 | 11/2021 | Lawrence et al. |
| 2021/0367515 | A1 | 11/2021 | Mackay et al. |
| 2021/0367517 | A1 | 11/2021 | Lawrence et al. |

FOREIGN PATENT DOCUMENTS

| | | |
|---|---|---|
| EP | 2775599 A1 | 9/2014 |
| EP | 3214746 A1 | 9/2017 |
| EP | 3240171 A1 | 11/2017 |
| FR | 2851091 A1 | 8/2004 |
| GB | 2555902 A | 5/2018 |
| TW | 201228201 A | 7/2012 |
| WO | 2012135778 A1 | 10/2012 |
| WO | 2017027393 A1 | 2/2017 |
| WO | 2019135820 A1 | 7/2019 |

OTHER PUBLICATIONS

Yu, Yangwei: "Choosing the Boost with Bypass or Pass Through", Jun. 30, 2017, Retrieved from the Internet Sep. 10, 2021.

Texas Instruments: TPS61291 Loe IQ Boost Converter with Bypass Operation, Sep. 30, 2014, Retrieved from the Internet Sep. 10, 2021.

International Search Report and Written Opinion of the International Searching Authority, International Application No. PCT/US2020/039509, dated Oct. 8, 2021.

International Search Report and Written Opinion of the International Searching Authority, International Application No. PCT/US2020/041535, dated Oct. 14, 2021.

Search Report under Section 17, UKIPO, Application No. GB2106142.9, dated Oct. 20, 2021.

Combined Search and Examination Report under Sections 17 and 18(3), UKIPO, Application No. GB2106144.5, dated Oct. 25, 2021.

International Search Report and Written Opinion of the International Searching Authority, International Application No. PCT/US2021/041547, dated Nov. 2, 2021.

International Search Report and Written Opinion of the International Searching Authority, International Application No. PCT/US2021/041918, dated Nov. 10, 2021.

International Search Report and Written Opinion of the International Searching Authority, International Application No. PCT/US2021/041544, dated Nov. 10, 2021.

International Search Report and Written Opinion of the International Searching Authority, International Application No. PCT/US2020/047237, dated Oct. 30, 2020.

Stala, Robert et al., "A Switched-Capacitor DC-DC Converter with Variable Number of Voltage Gains and Fault-Tolerant Operation", IEEE Transactions on Industrial Electronics, IEEE Service Center, Piscataway, NJ, US, vol. 66, No. 5, May 1, 2019.

International Search Report and Written Opinion of the International Searching Authority, International Application No. PCT/US2021/029631, dated Jul. 23, 2021.

Qiu et al., "Digital Average Current-Mode Control of PWM DC-DC Converts without Current Sensors", IEEE Transactions on Industrial Electronics, IEEE Service Center, vol. 57, No. 5, May 10, 2010, Piscataway, NJ, USA.

International Search Report and Written Opinion of the International Searching Authority, International Application No. PCT/US2021/029584, dated Jul. 30, 2021.

International Search Report and Written Opinion of the International Searching Authority, International Application No. PCT/US2021/032474, dated Aug. 3, 2021.

Vinnikov et al., "Solar Optiverter—A Novel Hybrid Approach to the PHotovoltaic Module Level Power Electronics", IEEE Transactions on Industrial Electronics, IEEE Service Center, vol. 66, No. 5, May 1, 2019, pp. 3869-3880, Piscataway, NJ, USA.

International Search Report and Written Opinion of the International Searching Authority, International Application No. PCT/US2021/032496, dated Aug. 4, 2021.

International Search Report and Written Opinion of the International Searching Authority, International Application No. PCT/US2021/030932, dated Aug. 20, 2021.

Van Vroonhoven, Caspar, A 0-to-60V-Input Vcm Coulomb Counter with Signal-Dependent Supply Current and ±0.5% Gain Inaccuracy from −50° C to 125° C, 2020 IEEE International Solid-State Circuits Conference, Feb. 19, 2020.

International Search Report and Written Opinion of the International Searching Authority, International Application No. PCT/US2021/039356, dated Oct. 1, 2021.

Stmicroelectronics NV, AN4218—Hardware design guideline power supply and voltage measurement—Application Note, Doc ID 024014 Rev 3, 26 pages, Oct. 2015.

Freescale Semiconductor, Inc., Multimedia Applications Division, i.MX233 Power Management Unit and Battery Charger—Application Note, Document No. AN3883, Rev. 0, 36 pages, Jul. 2009.

Texas Instruments, TPS6128x Low-, Wide- Voltage Battery Front-End DC/DC Converter Single-Cell Li-Ion, Ni-Rich, Si-Anode Applications—Data sheet, SLVSBI1A, 57 pages, Oct. 2013, Revised Sep. 2014.

Texas Instruments, Designing Robust TPS65217 Systems for VIN Brownout—Application Report, 13 pages, Oct. 2017.

Renesas Electronics Corporation, Preventing Subsystem Brownouts in Mobile Devices—White Paper, 6 pages.

MFJ Enterprises, Inc., MFJ—Super Battery Booster—Model MFJ-4416C—Instruction Manual, Version 0A, 16 pages, 2017.

International Search Report and Written Opinion of the International Searching Authority, International Application No. PCT/US2020/056782, dated Mar. 4, 2021.

\* cited by examiner

MULTIPHASE INDUCTIVE BOOST CONVERTER WITH MULTIPLE OPERATIONAL PHASES

RELATED APPLICATIONS

The present application is a continuation of U.S. Nonprovisional patent application Ser. No. 17/075,139, filed Oct. 20, 2020, which claims priority to U.S. Provisional Patent Application Ser. No. 62/926,046, filed Oct. 25, 2019, each of which is incorporated by reference herein in its entirety.

FIELD OF DISCLOSURE

The present disclosure relates in general to circuits for electronic devices, including without limitation personal audio devices such as wireless telephones and media players, and more specifically, to limited average current in a peak-controlled boost converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

In many instances, it is desirable to regulate an output voltage of a power converter, including regulating the output voltage at a minimum voltage level.

SUMMARY

In accordance with the teachings of the present disclosure, one or more disadvantages and problems associated with existing approaches to operating a power converter may be reduced or eliminated.

In accordance with embodiments of the present disclosure, a battery management system configured to electrically couple to a battery may include a boost converter comprising a plurality of switches arranged to provide a boosted output voltage at an output of the boost converter from a source voltage of the battery and a bypass switch coupled between the battery and the output, wherein the battery management system is operable in a plurality of modes comprising a bypass mode wherein the source voltage is bypassed to the output and when the battery management system is in the bypass mode, at least one switch of the plurality of switches is enabled to increase a conductance between the battery and the output.

In accordance with these and other embodiments of the present disclosure, a battery management circuit for a battery-powered mobile device may include a battery management circuit comprising voltage monitoring circuitry and a multi-phase inductive boost converter having at least three boost converter phases, and may be configured to compare a battery voltage of the battery-powered mobile device to a minimum threshold voltage, enable the boost converter to provide a boosted output voltage at an output of the boost converter from a source voltage of the battery if the battery voltage is below the minimum threshold voltage, and bypass the battery voltage to the output of the boost converter if the battery voltage is above the minimum threshold voltage.

In accordance with these and other embodiments of the present disclosure, a method may include, in a battery management system configured to electrically couple to a battery and comprising a boost converter having a plurality of switches arranged to provide a boosted output voltage at an output of the boost converter from a source voltage of the battery, operating a battery management system in a plurality of modes comprising a bypass mode wherein the source voltage is bypassed to the output via a bypass switch coupled between the battery and the output. The method may further include when the battery management system is in the bypass mode, enabling at least one switch of the plurality of switches to increase a conductance between the battery and the output.

In accordance with these and other embodiments of the present disclosure, a method may be provided for use in a battery management circuit for a battery-powered mobile device wherein the battery management circuit comprises voltage monitoring circuitry and a multi-phase inductive boost converter having at least three boost converter phases. The method may include comparing a battery voltage of the battery-powered mobile device to a minimum threshold voltage, enabling the boost converter to provide a boosted output voltage at an output of the boost converter from a source voltage of the battery if the battery voltage is below the minimum threshold voltage, and bypassing the battery voltage to the output of the boost converter if the battery voltage is above the minimum threshold voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
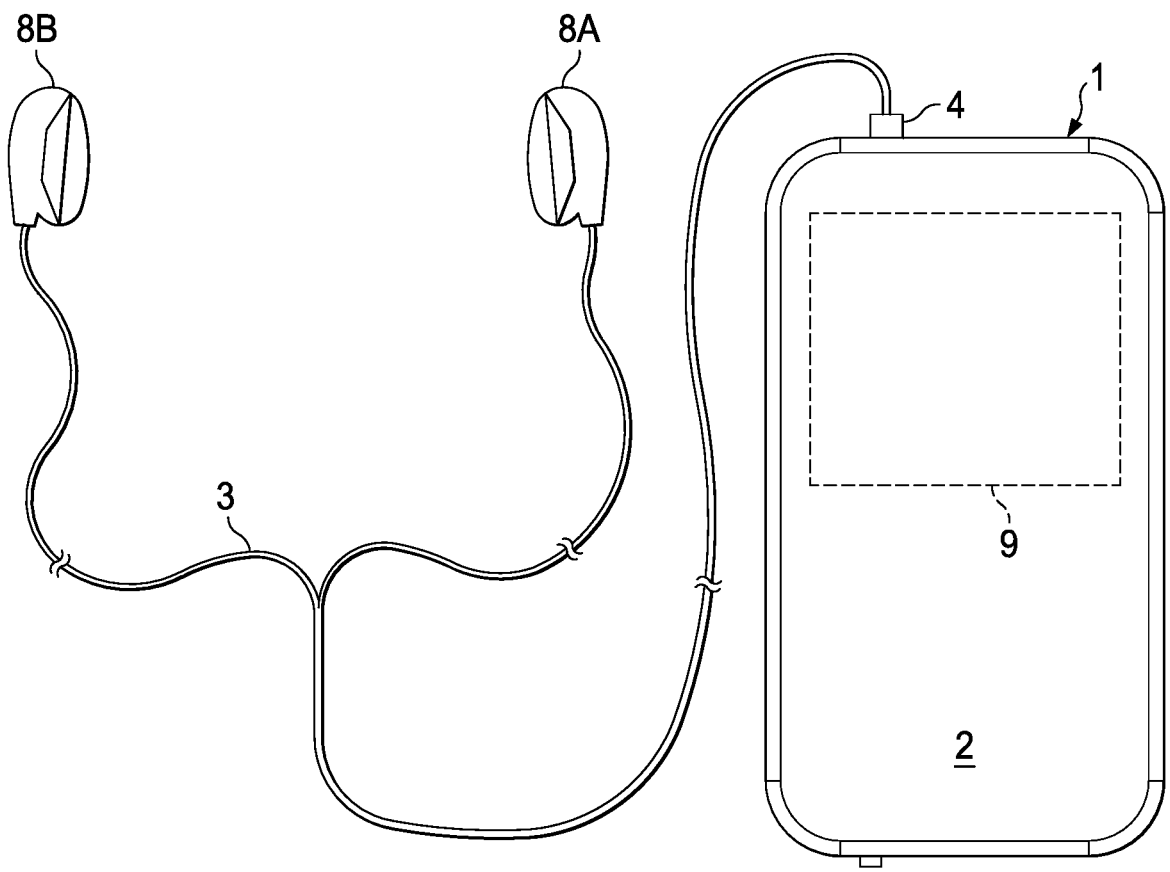
FIG. 1 illustrates an example portable electronic device, in accordance with embodiments of the present disclosure.

FIG. 1 illustrates an example portable electronic device 1, in accordance with embodiments of the present disclosure. FIG. 1 depicts portable electronic device 1 coupled to a headset 3 in the form of a pair of earbud speakers 8A and 8B. Headset 3 depicted in FIG. 1 is merely an example, and it is understood that portable electronic device 1 may be used in connection with a variety of audio transducers, including without limitation, headphones, earbuds, in-ear earphones, and external speakers. A plug 4 may provide for connection of headset 3 to an electrical terminal of portable electronic device 1. Portable electronic device 1 may provide a display to a user and receive user input using a touch screen 2, or alternatively, a standard liquid crystal display (LCD) may be combined with various buttons, sliders, and/or dials disposed on the face and/or sides of portable electronic device 1.

Figure 2:
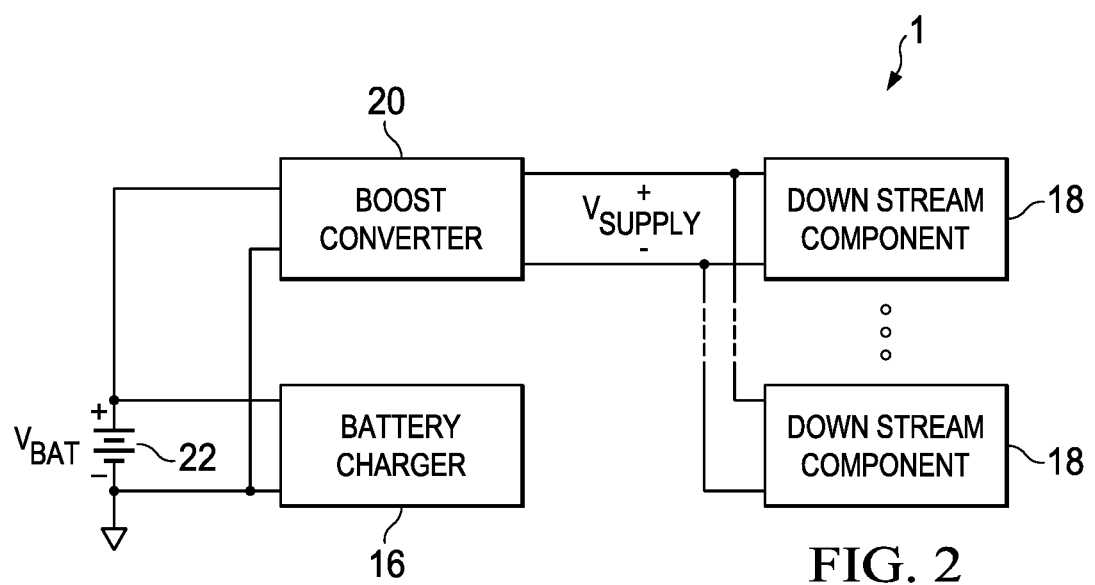
FIG. 2 illustrates a block diagram of selected components internal to a portable electronic device, in accordance with embodiments of the present disclosure.

FIG. 2 illustrates a block diagram of selected components integral to portable electronic device 1, in accordance with embodiments of the present disclosure. As shown in FIG. 2, portable electronic device 1 may include a boost converter 20 configured to generate a supply voltage $V_{SUPPLY}$ to a plurality of downstream components 18 of portable electronic device 1. Downstream components 18 of portable electronic device 1 may include any suitable functional circuits or devices of portable electronic device 1, including without limitation processors, audio coder/decoders, amplifiers, display devices, etc. As shown in FIG. 2, portable electronic device 1 may also include a charger 16 for recharging battery 22.

In some embodiments of portable electronic device 1, boost converter 20 and battery charger 16 may comprise the only components of portable electronic device 1 electrically coupled to battery 22, and boost converter 20 may electrically interface between battery 22 and all downstream components of portable electronic device 1. However, in other embodiments of portable electronic device 1, some downstream components 18 may electrically couple directly to battery 22.

Figure 3A:
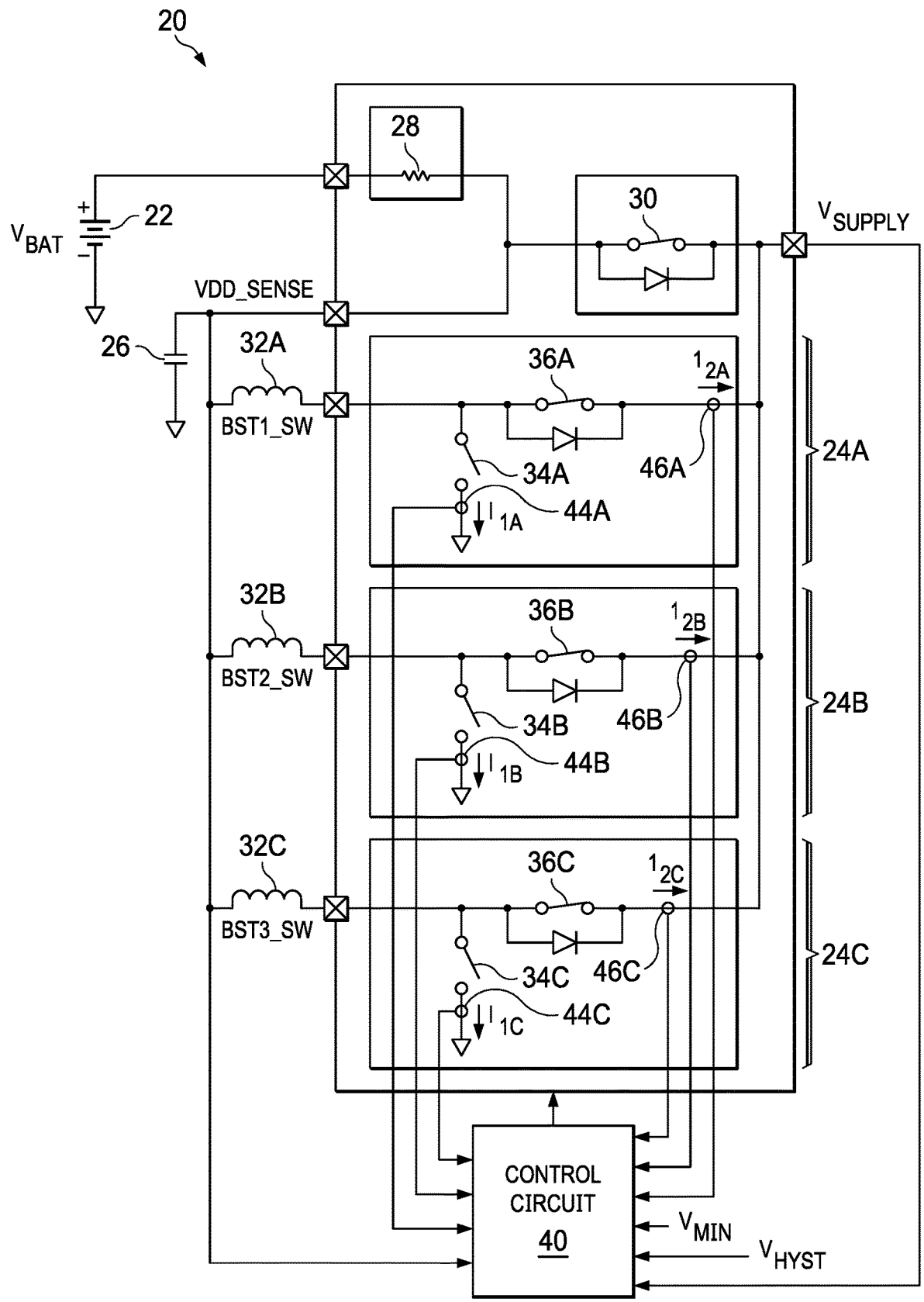
FIG. 3A illustrates a block diagram of selected components of an example boost converter with multiple modes of operation depicting operation in a bypass mode, in accordance with embodiments of the present disclosure.

FIG. 3A illustrates a block diagram of selected components of an example boost converter 20 with multiple modes of operation depicting operation in a bypass mode, in accordance with embodiments of the present disclosure. In some embodiments, boost converter 20 may be used to implement a power supply. As shown in FIG. 3A, boost converter 20 may include a battery 22, a plurality of inductive boost phases 24, a sense capacitor 26, a sense resistor 28, a bypass switch 30, and a control circuit 40. As shown in FIG. 3A, each inductive boost phase 24 may include a power inductor 32, a charge switch 34 and a rectification switch 36.

Figure 3B:
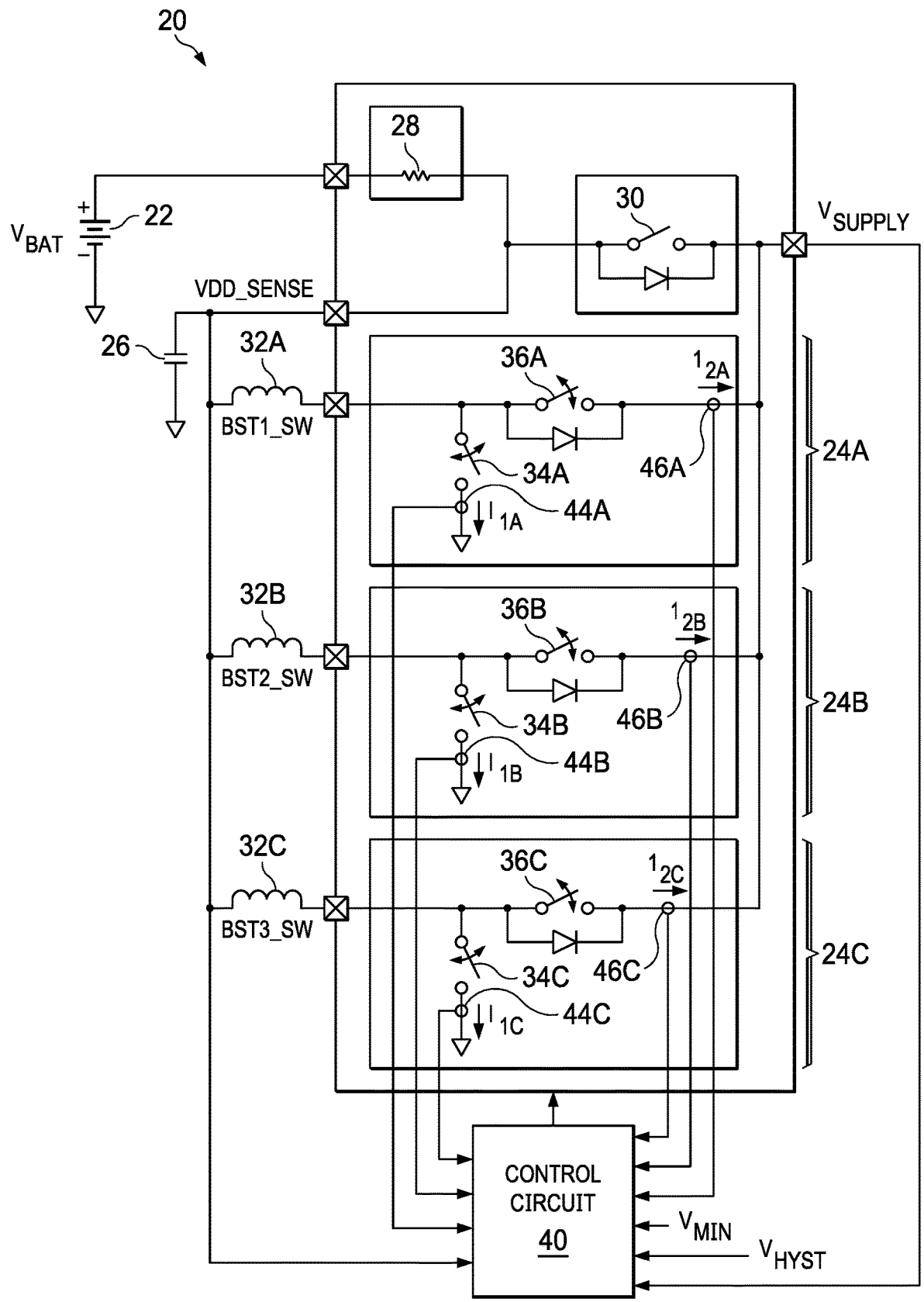
FIG. 3B illustrates a block diagram of selected components of an example boost converter with multiple modes of operation depicting operation in a boost active mode, in accordance with embodiments of the present disclosure.
Figure 3C:
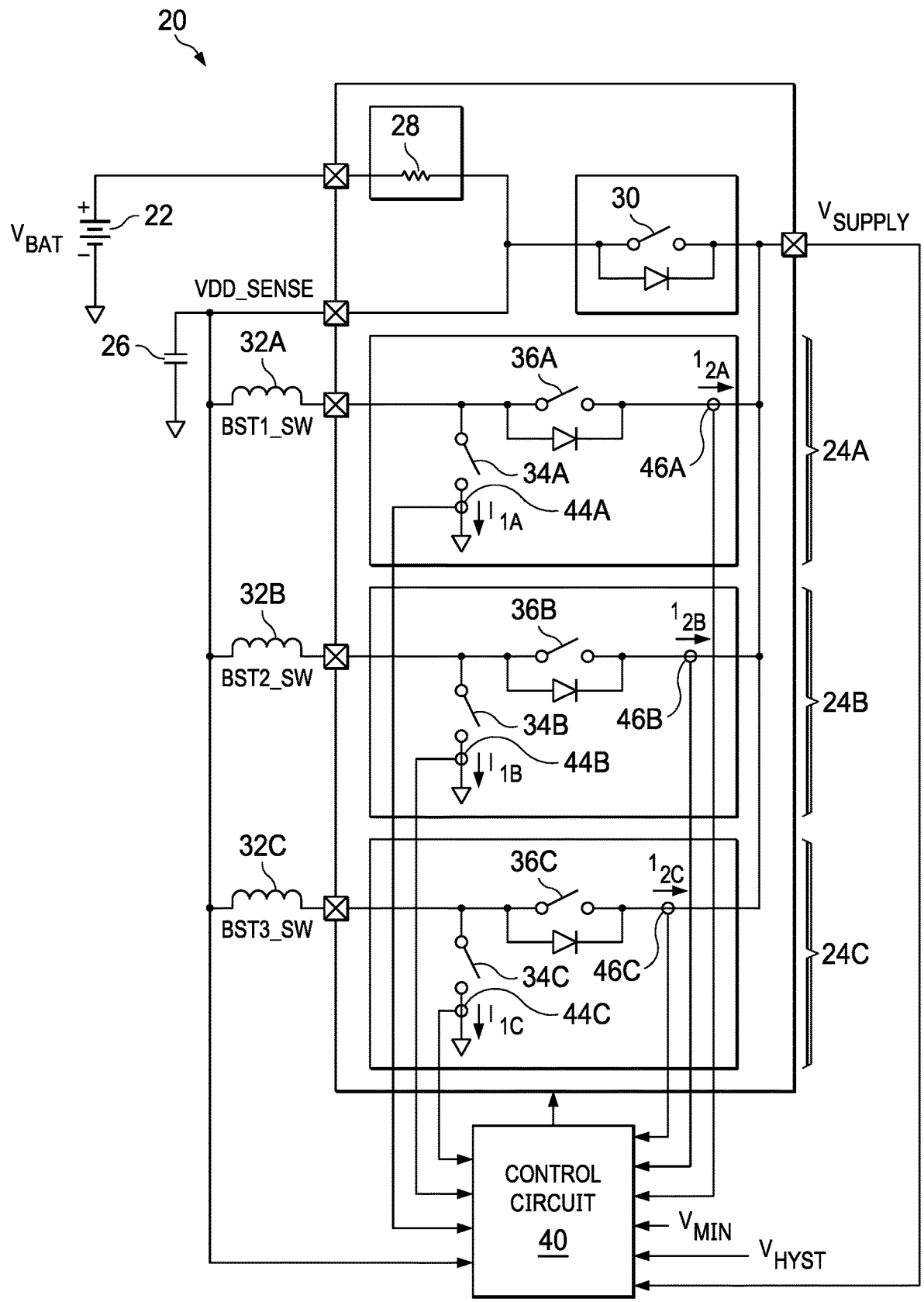
FIG. 3C illustrates a block diagram of selected components of an example boost converter with multiple modes of operation depicting operation in a boost inactive mode, in accordance with embodiments of the present disclosure.

Although FIGS. 3A-3C depict boost converter 20 having three inductive boost phases 24, embodiments of boost converter 20 may have any suitable number of inductive boost phases 24. In some embodiments, boost converter 20 may comprise three or more inductive boost phases 24. In other embodiments, boost converter 20 may comprise fewer than three phases (e.g., a single phase or two phases).

Boost converter 20 may operate in the bypass mode when supply voltage $V_{SUPPLY}$ generated by boost converter 20 is greater than a threshold minimum voltage $V_{MIN}$. In some embodiments, such threshold minimum voltage $V_{MIN}$ may be a function of a monitored current (e.g., a current through sense resistor 28). In some embodiments, such threshold minimum voltage $V_{MIN}$ may be varied in accordance with variations in the monitored current, in order to provide desired headroom from components supplied from supply voltage $V_{SUPPLY}$. Control circuit 40 may be configured to sense supply voltage $V_{SUPPLY}$ and compare supply voltage $V_{SUPPLY}$ to threshold minimum voltage $V_{MIN}$. In the event that supply voltage $V_{SUPPLY}$ and voltage VDD_SENSE across sense capacitor 26 are greater than threshold minimum voltage $V_{MIN}$, control circuit 40 may activate (e.g., enable, close, turn on) bypass switch 30 and one or more rectification switches 36 and deactivate (e.g., disable, open, turn off) charge switches 34. In such bypass mode, the resistances of rectification switches 36, power inductors 32, and bypass switch 30 may combine to minimize a total effective resistance of a path between battery 22 and supply voltage $V_{SUPPLY}$.

As also shown in FIG. 3A, each phase 24 of boost converter 20 may include a current sensor 44 (e.g., current sensors 44A, 44B, and 44C) configured to sense a respective current $I_1$ (e.g., currents $I_{1A}$, $I_{1B}$, and $I_{1C}$) through its respective charge switch 34 and sense a respective current $I_2$ (e.g., currents $I_{2A}$, $I_{2B}$, and $I_2$c) through its respective rectification switch 36. Control circuit 40 may receive such currents $I_1$ and $I_2$, and perform control of boost converter 20 based on such measured currents $I_1$ and $I_2$. For example, control circuit 40 may perform control based on currents $I_1$ and $I_2$ and a comparison to a set point peak current or valley current through power inductors 32. In some embodiments, control circuit 40 may also implement a timer for control of boost converter 20, such as, for example, a timer that determines an approximate time of occurrence of a valley current through power inductors 32.

FIG. 3B illustrates a block diagram of selected components of example boost converter 20 depicting operation in a boost active mode, in accordance with embodiments of the present disclosure. Boost converter 20 may operate in the boost active mode when battery voltage $V_{BAT}$ in the bypass mode is insufficient to maintain supply voltage $V_{SUPPLY}$ above threshold minimum voltage $V_{MIN}$. In the boost active mode, control circuit 40 may deactivate (e.g., disable, open, turn off) bypass switch 30, and periodically commutate charge switches 34 and rectification switches 36 of inductive boost phase 24 (as described in greater detail below) to generate a supply voltage $V_{SUPPLY}$ larger in magnitude to battery voltage $V_{BAT}$, in order to provide a programmed (or servoed) desired current (e.g., average current) to the electrical node of supply voltage $V_{SUPPLY}$, while maintaining supply voltage $V_{SUPPLY}$ above threshold minimum voltage $V_{MIN}$. In the boost active mode, voltage VDD_SENSE may fall below threshold minimum voltage $V_{MIN}$. Further, in the boost active mode, boost converter 20 may operate as a single phase boost converter or multi-phase boost converter.

In the boost active mode, control circuit 40 may operate by boost converter 20 by operating inductive boost phase 24 in a peak and valley detect operation, as described in greater detail below with reference to FIGS. 4A-4C. The resulting switching frequency of charge switches 34 and rectification switches 36 of inductive boost phase 24 may be determined by the sense voltage VDD_SENSE, supply voltage $V_{SUPPLY}$, an inductance of power inductor 32A, and a programmed ripple parameter (e.g., a configuration of a target current ripple in power inductor 32A). When operating in boost active mode, control circuit 40 may also cause inductive boost phases 24B and 24C to follow a peak and valley operation, where the valley location is determined by a timer in order to ensure proper phase interleaving for all phases of the design.

FIG. 3C illustrates a block diagram of selected components of boost converter 20 depicting operation in a boost inactive mode, in accordance with embodiments of the present disclosure. Boost converter 20 may operate in the boost inactive mode when supply voltage $V_{SUPPLY}$ generated by boost converter 20 rises above a sum of threshold minimum voltage $V_{MIN}$ and a hysteresis voltage $V_{HYST}$ and a sense voltage VDD_SENSE remains below threshold minimum voltage $V_{MIN}$. In the boost inactive mode, control circuit 40 may deactivate (e.g., disable, open, turn off) bypass switch 30, charge switches 34, and rectification switches 36. Thus, when sense voltage VDD_SENSE remains below threshold minimum voltage $V_{MIN}$, control circuit 40 prevents boost converter 20 from entering the bypass mode in order to not backpower battery 22 from supply voltage $V_{SUPPLY}$. Further, if supply voltage $V_{SUPPLY}$ should fall below threshold minimum voltage $V_{MIN}$, control circuit 40 may cause boost converter 20 to again enter the boost active mode in order to increase supply voltage $V_{SUPPLY}$ to the sum of threshold minimum voltage $V_{MIN}$ and a hysteresis voltage $V_{HYST}$.

Figure 4A:
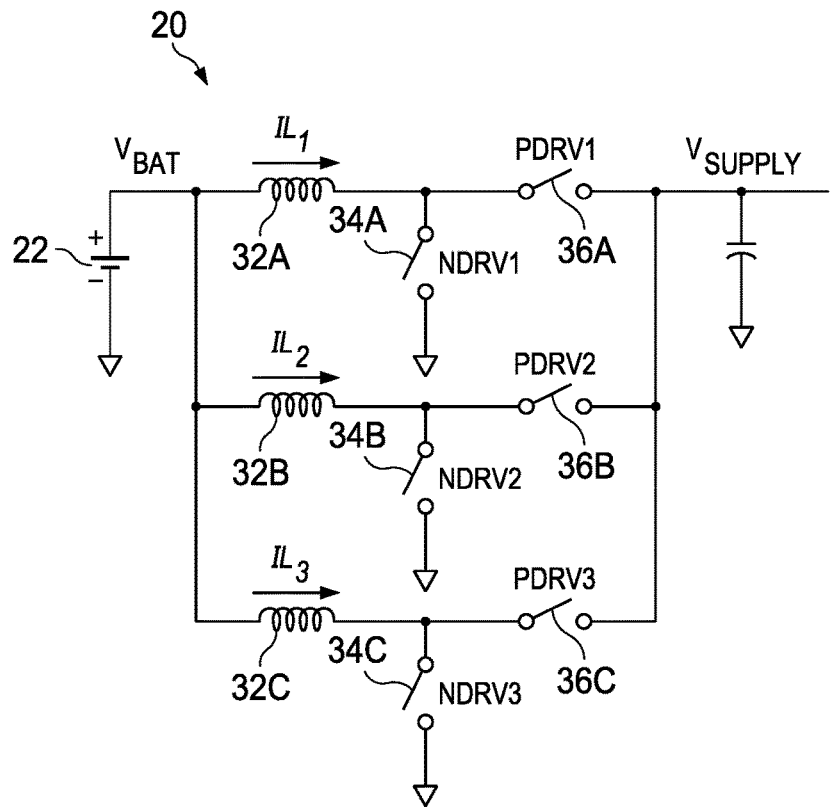
FIG. 4A illustrates a block diagram of selected components of inductive boost phases of the example boost converter depicted in FIGS. 3A-3C, in accordance with embodiments of the present disclosure.

FIG. 4A illustrates a block diagram of selected components of inductive boost phases 24, in accordance with embodiments of the present disclosure. As shown in FIG. 4A, control circuit 40 may generate switch control signals NDRV1, NDRV2, and NDRV3 for controlling charge switches 34A, 34B, and 34C, respectively, and may generate control signals PDRV1, PDRV2, and PDRV3 for controlling rectification switches 36A, 36B, and 36C, respectively.

Figure 4C:
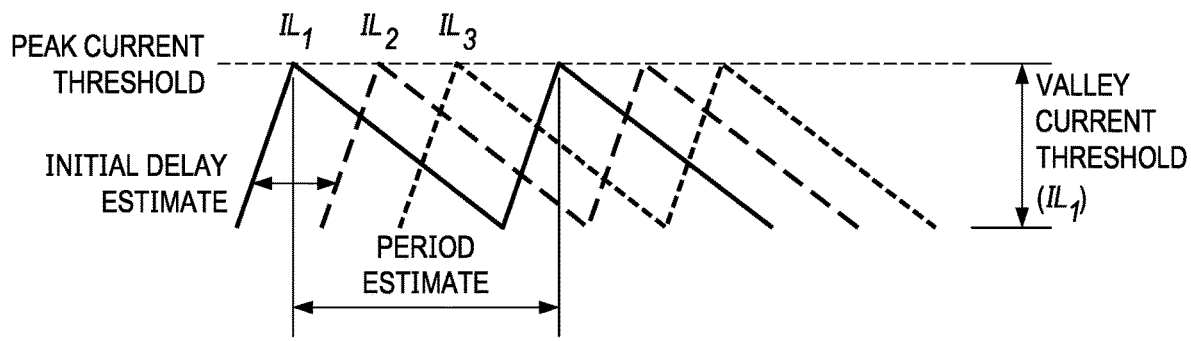
FIG. 4C illustrates a graph of example power inductor current depicting multiphase boost converter phase shifting of the inductive boost phases shown in FIG. 4A, in accordance with embodiments of the present disclosure.
Figure 4B:
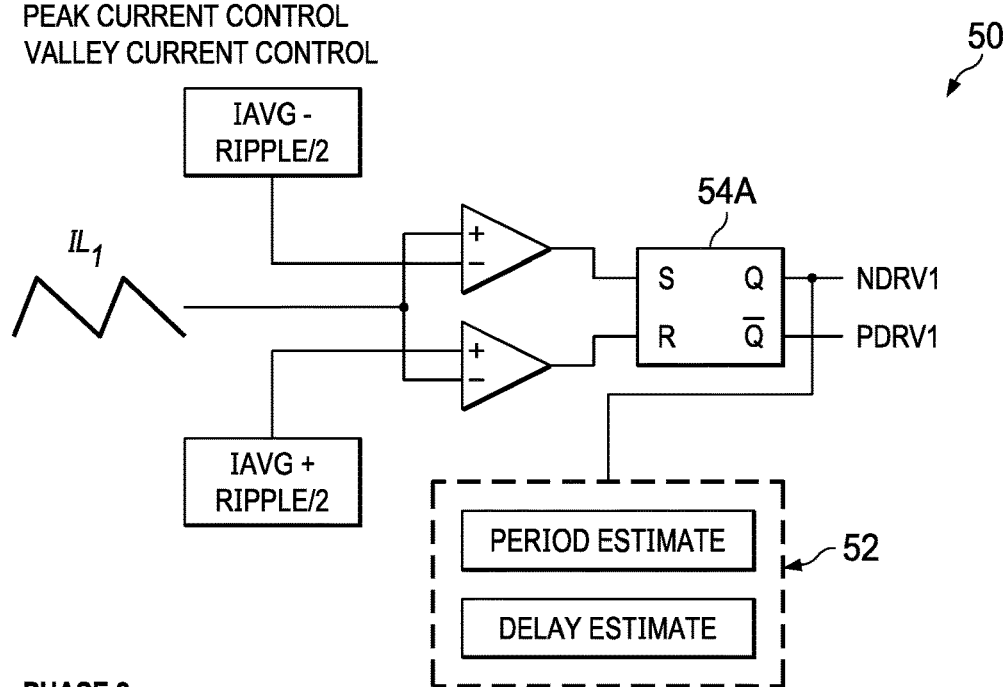
FIG. 4B illustrates an example control signal generation circuit for generating switch control signals of charge switches and rectification switches of the inductive boost phases shown in FIG. 4A, in accordance with embodiments of the present disclosure.
Figure 4B:
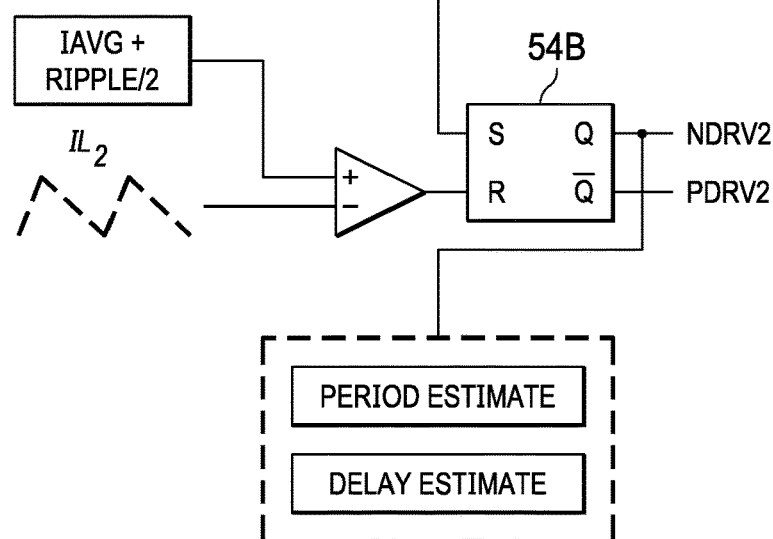
Figure 4B:
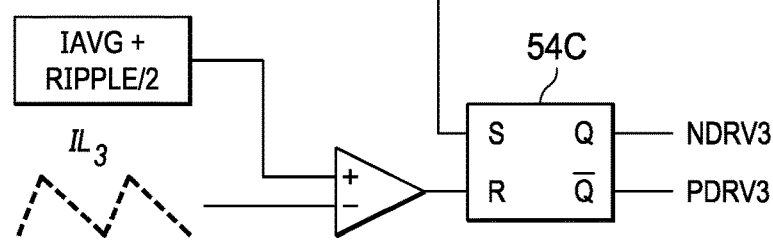

FIG. 4B illustrates an example control signal generation circuit 50 for generating switch control signals NDRV1, NDRV2, NDRV3, PDRV1, PDRV2, and PDRV3 of charge switches 34 and rectification switches 36 of the inductive boost phases shown in FIG. 4A. Control signal generation circuit 50 may be implemented in whole or in part by control circuit 40.

FIG. 4C illustrates a graph of example power inductor current depicting multiphase boost converter phase shifting of inductive boost phases 24 while operating in the boost active mode, in accordance with embodiments of the present disclosure.

In operation, when entering the boost active mode, control signal generation circuit 50 may trigger primary inductive boost phase 24A by activating charge switch 34A with switch control signal NDRV1 in order to charge power inductor 32A. As shown in FIG. 4B, switch control signal NDRV1 may be used to trigger a timer 52 that estimates a delay after which secondary inductive boost phase 24B should begin to charge by activating charge switch 34B with switch control signal NDRV2. This delay estimate may introduce an error in the phase shifting of the initial cycle of secondary inductive boost phase 24B immediately following the entry into the boost active mode, but after a few cycles of operation, the proper phasing of secondary inductive boost phase 24B (and tertiary inductive boost phase 24C) may be obtained. The key to operation of control signal generation circuit 50 is that it may prevent two inductive boost phases 24 from charging at the same time, thus ensuring current is pulled from battery 22 in a staggered fashion. Control signal generation circuit 50 may employ a similar approach to trigger tertiary inductive boost phase 24C with switch control signal NDRV2 serving as the trigger.

Once primary phase inductor current $iL_1$ crosses a set peak value (e.g., $i_{AVG}$+RIPPLE/2), control signal generation circuit 50 may deactivate charge switch 34A and activate rectification switch 36A. Secondary inductive boost phase 24B and tertiary inductive boost phase 24C may be controlled by their dedicated set-reset logic 54B and 54C, very similar to primary inductive boost phase 24A being controlled by its set-reset logic 54A. This sequence of operations may continue until power converter 20 exits the boost active mode.

In order to properly phase shift secondary inductive boost phase 24B and tertiary inductive boost phase 24C for phase interleaving and to account for manufacturing tolerances between power inductors 32 and potential impedance fluctuations between inductive boost phases 24, in addition to the peak and valley current control on primary inductive boost phase 24A, secondary inductive boost phase 24B and tertiary inductive boost phase 24C may each use a time-based scheme to determine the valley location of such inductive boost phases 24.

In embodiments of the present disclosure, control circuit 40 may measure a current through sense resistor 28 (e.g., based on a difference between sense voltage VDD_SENSE and battery voltage $V_{BAT}$). In some embodiments, sense resistor 28 may comprise a relatively low-impedance resistor (e.g., approximately 10 mΩ). In these and other embodiments, control circuit 40 may measure a current through a power inductor 32, which may have a high-impedance resistance (e.g., approximately 100 mΩ) compared to sense resistor 28. In such embodiments, control circuit 40 may measure current through the high-impedance path when a lower current level is detected and measure current through the low-impedance path when a higher current level is detected.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A battery management circuit for a battery-powered mobile device, comprising:
    a multi-phase inductive boost converter having at least two boost converter phases wherein each of the at least two boost converter phases comprises its own respective inductor, its own respective charge switch, and its own respective rectification switch; and
    voltage monitoring and control circuitry configured to:
        compare a battery voltage of a battery of the battery-powered mobile device to a minimum threshold voltage;
        enable the boost converter to provide a boosted output voltage at an output of the boost converter from a source voltage of the battery if the battery voltage is below the minimum threshold voltage; and
        bypass the battery voltage to the output of the boost converter via one or more of the charge switches and rectification switches of the at least two boost converter phases if the battery voltage is above the minimum threshold voltage.

2. The battery management circuit of claim 1, further comprising measurement circuitry configured to monitor current flow through the battery management circuit.

3. The battery management circuit of claim 2, wherein the minimum threshold voltage is a function of a monitored current level.

4. The battery management circuit of claim 3, further comprising:
    a low-resistance path;
    a high-resistance path having electrical resistance significantly higher than the low-resistance path; and
    the measurement circuitry configured to:
        measure the monitored current level through the low-resistance path in a first range of electrical current; and
        measure the monitored current level through the high-resistance path in a second range of electrical current lower in magnitude than the first range.

5. The battery management circuit of claim 4, wherein the low-resistance path comprises a path through a sense resistor coupled between the battery and a bypass switch.

6. The battery management circuit of claim 5, wherein the high-resistance path comprises a path through a sense resistor and at least one switch of the boost converter.

7. A method, in a battery management circuit for a battery-powered mobile device wherein the battery management circuit comprises voltage monitoring circuitry and a multi-phase inductive boost converter having at least two boost converter phases wherein each of the at least two boost converter phases comprises its own respective inductor, its own respective charge switch, and its own respective rectification switch, the method comprising:
    comparing a battery voltage of a battery of the battery-powered mobile device to a minimum threshold voltage;
    enabling the boost converter to provide a boosted output voltage at an output of the boost converter from a source voltage of the battery if the battery voltage is below the minimum threshold voltage; and
    bypassing the battery voltage to the output of the boost converter if the battery voltage is above the minimum threshold voltage.

8. The method of claim 7, further comprising monitoring current flow through the battery management circuit with measurement circuitry.

9. The method of claim 8, wherein the minimum threshold voltage is a function of a monitored current level.

10. The method of claim 9, further comprising:
    measuring the monitored current level through a low-resistance path of the battery management system in a first range of electrical current; and
    measuring the monitored current level through a high-resistance path having electrical resistance significantly higher than the low-resistance path in a second range of electrical current lower in magnitude than the first range.

11. The method of claim 10, wherein the low-resistance path comprises a path through a sense resistor coupled between the battery and a bypass switch.

12. The method of claim 11, wherein the high-resistance path comprises a path through a sense resistor and at least one switch of the boost converter.

13. A battery management system configured to electrically couple to a battery, the battery management system comprising:
- a boost converter comprising a plurality of switches arranged to selectively provide a boosted output voltage at an output of the boost converter from a source voltage of the battery, the boost converter comprising a plurality of boost converter phases comprising:
  - a first boost converter phase comprising a first inductor, a first charge switch, and a first rectification switch; and
  - a second boost converter phase comprising a second inductor, a second charge switch, and a second rectification switch; and
- wherein:
  - the battery management system is operable in a plurality of modes comprising a bypass mode wherein the source voltage is bypassed to the output; and
  - when the battery management system is in the bypass mode, the first rectification switch and the second rectification switch are activated and the first charge switch and the second charge switch are deactivated.

14. The battery management system of claim 13, wherein the battery management system operates in the bypass mode when a battery voltage of the battery is above a minimum threshold voltage.

15. The battery management system of claim 13, wherein:
- the plurality of boost converter phases comprises a third boost converter phase comprising a third inductor, a third charge switch, and a third rectification switch; and
- when the battery management system is in the bypass mode, the third rectification switch is activated and the third charge switch is deactivated.

16. A method, in a battery management system configured to electrically couple to a battery, the battery management system comprising a boost converter comprising a plurality of switches arranged to selectively provide a boosted output voltage at an output of the boost converter from a source voltage of the battery, wherein the boost converter comprises a plurality of boost converter phases comprising a first boost converter phase comprising a first inductor, a first charge switch, and a first rectification switch and a second boost converter phase comprising a second inductor, a second charge switch, and a second rectification switch, the method comprising:
- operating the battery management system in a plurality of modes comprising a bypass mode wherein the source voltage is bypassed to the output; and
- when the battery management system is in the bypass mode, activating the first rectification switch and the second rectification switch and deactivating the first charge switch and the second charge switch.

17. The method of claim 16, further comprising operating the battery management system in the bypass mode when a battery voltage of the battery is above a minimum threshold voltage.

18. The method of claim 16, wherein:
- the plurality of boost converter phases comprises a third boost converter phase comprising a third inductor, a third charge switch, and a third rectification switch; and
- the method further comprises, when the battery management system is in the bypass mode, activating the third rectification switch and deactivating the third charge switch.

* * * * *

UNITED STATES PATENT AND TRADEMARK OFFICE
CERTIFICATE OF CORRECTION

| | |
|---|---|
| PATENT NO. | : 11,616,434 B2 |
| APPLICATION NO. | : 17/892575 |
| DATED | : March 28, 2023 |
| INVENTOR(S) | : King et al. |

It is certified that error appears in the above-identified patent and that said Letters Patent is hereby corrected as shown below:

In the Claims

In Column 8, Line 55, in Claim 10, delete "the battery management system" and insert -- the battery management circuit --, therefor.

Signed and Sealed this
First Day of August, 2023

Katherine Kelly Vidal
*Director of the United States Patent and Trademark Office*